April 21, 1953     J. D. RUST     2,635,736
AUTOMATIC SLAT-BELT TIGHTENER FOR COTTON-PICKING MACHINES
Filed April 25, 1950
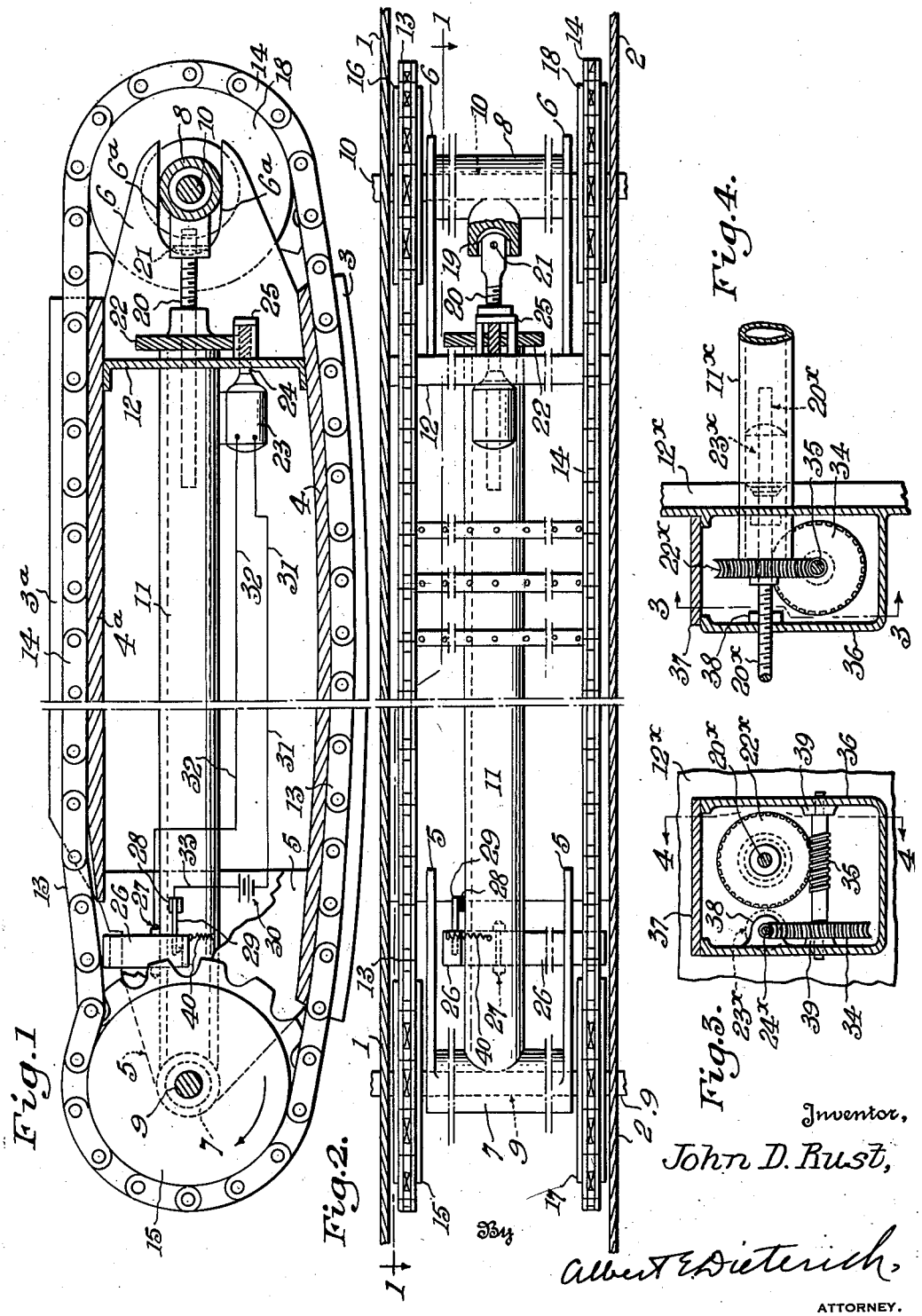
Inventor,
John D. Rust,
By Albert E. Dieterich,
ATTORNEY.

Patented Apr. 21, 1953

2,635,736

UNITED STATES PATENT OFFICE 2,635,736

AUTOMATIC SLAT-BELT TIGHTENER FOR COTTON-PICKING MACHINES

John D. Rust, Pine Bluff, Ark.

Application April 25, 1950, Serial No. 158,036

7 Claims. (Cl. 198—208)

My invention relates to endless slatted conveyors of cotton picking units such, for example, as are disclosed in Patents 2,085,046 and 2,533,630. Such conveyors from time to time become slack due to wear of the chain, making it necessary for the attendant to adjust the sprocket bearings at one end of the conveyor frame in order to take up the slack. As unskilled labor is sometimes used to run the cotton picking machines, the adjusting of the chain tensions is occasionally overlooked and, as a result of excessive slack, the chain will fold in between the driving sprocket and the end of the inner chain guide track and become locked. When this happens, the machine is stalled until the slack is taken out of the chain. Up until now, this chain adjustment has been done by hand.

In order to maintain the conveyor chains in proper working condition at all times I have devised means for automatically taking up the slack as soon as it occurs, which means is governed by the slack in the chain itself. I wish to point out that it is the nature of a driven chain to tend to stay engaged with the sprocket teeth and to follow them around the sprocket wheel as far as possible. I propose to utilize this inward thrust of the slack conveyor chain to close a circuit to actuate a servo-motor to take up the slack in the chain automatically. The servo-motor turns a nut on a threaded shaft, the outer end of which is pivotally connected to the tubular housing for the idler wheel shaft at about its center so as to equalize the tension on the chains.

To the attainment of this and other objects, which will appear from the following description, my invention also resides in the novel details of construction, arrangement and combination of parts, which will hereinafter be first described in detail and will then be specifically pointed out in the appended claims, reference being had to the accompanying drawing, in which:

Fig. 1 is a section on the line 1—1 of Fig. 2.

Fig. 2 is a side elevation of the parts shown in Fig. 1, the chain guides 3 and 4 on the curved side of the conveyor being omitted in order to show the parts behind them, a portion of the structure shown in Fig. 2 also being broken away.

Fig. 3 is a detail section on the line 3—3 of Fig. 4, showing a slight modification of the invention.

Fig. 4 is a section on the line 4—4 of Fig. 3.

In the drawing, in which like numerals of reference indicate like parts in all the figures, 1 represents a top cover plate and 2 represents the bottom of that portion of the machine shown in the drawing.

3, 3$^a$ designate the outer chain guides and 4, 4$^a$ designate the inner chain guides, the inner chain guides 4, 4$^a$ forming part of a frame which includes the bottom plate 2 and the bearing plates 5, 5 and 6, 6.

7 and 8 indicate bearing pipes in which shafts 9 and 10 are journaled. The pipe 7 is rigidly secured to the plates 5, 5, while the pipe 8 is slidably mounted in slots 6$^a$ in the plate 6 in a direction from and toward the pipe 7. The shafts 9 and 10 carry sprockets 15, 16 for the upper chain 13, and sprockets 17, 18 for the lower chain 14. The shaft 9 is driven in a clockwise direction in Fig. 1, in any approved way so as to exert a pull on the chain passing between the guides 3 and 4.

Welded to pipe 7 is a long pipe 11 which extends longitudinally of the conveyor toward the pipe 8, but terminates short thereof and has its terminal end supported in a channel iron 12 that is secured to the backing guides 4, 4$^a$ hereinbefore referred to.

19 is a socket on the pipe 8 in which is a concave bearing for the outer end of a screw rod 20, the rod preferably being pinned at 21 to the socket member 19 so that the pipe 8 may have a slight rocking movement on the pivot 21. The socket 19 is rigidly secured to pipe 8 about midway between the chains so as to equalize the tension on the chains.

22 is a worm nut on the threaded rod 20, the nut bearing against the end of the pipe 11 into which the screw rod 20 projects. When the worm nut or gear 22 is turned in one direction, the screw rod 20 is forced outwardly from the pipe 11 to exert a sufficient force on the chains 13 and 14 to take up undesirable slack. In order to turn the worm nut or gear 22, I provide an electric servomotor 23 to whose shaft is attached a worm 24 that meshes with the worm gear 22. The free end of the worm shaft 24 is supported in a suitable bearing bracket 25 secured to the channel iron 12 (see Figs. 1 and 2).

26 is a rocking lever that is pivoted at 27 to the pipe 11 and has its lower end in a position to be engaged by the lower chain 14 at the place where the slack occurs, which is adjacent to the drive sprockets 15 and 17. The lever 26, when engaged by the slack portion of the chain, contacts a contact arm 29 mounted on an insulated block 28 on the pipe 11.

30 designates a battery or source of current supply, one pole of which is connected by a wire 31 to the motor 23, while the other pole of the battery is connected by a wire 33 to the contact arm 29. A wire 32 connects the rocking lever 26 with the motor 23.

From this construction it will be seen that when undesirable slack occurs in the chains the rocking lever 26 will close the electric circuit for energizing the motor 23 to turn its shaft in a direction to feed the screw 20 outwardly and consequently will move the pipe 8, shaft 10, and sprockets 13 and 14 in a direction away from the other sprockets so as to take out the undesirable slack in the chain and permit the lever 26 to move outwardly with the chain and move to a position to open the circuit of the motor 23, a spring 40 being provided for that purpose. The spring also maintains contact between the lever 26 and the lower chain 14 at all times so that immediately when slack occurs the motor circuit will become closed. As soon as the slack has been taken up, of course the circuit opens again.

Instead of the directly connected drive between the motor 23 and the screw rod 20, the drive may be effected in the manner shown in Figs. 3 and 4 of the drawings, in which those parts which correspond to like parts in Figs. 1 and 2 bear the same reference numeral plus the index letter $x$. A detailed description thereof is therefore believed to be unnecessary.

In the modified form of the invention the worm nut 22ˣ meshes with a transversely disposed worm 35 carrying a second worm wheel 34 with which the motor worm 24ˣ meshes. A gear box 36 is also provided with a removable cover 37, the gear box having suitable bearings 38 and 39 for the shafts of the worms 24ˣ and 35 respectively.

While I have referred to the driven members on which the chains pass as "sprockets," toothless wheels may be used instead of toothed sprockets; so I wish it understood that toothless driven wheels and driven sprockets are equivalent.

Also, while I have referred to my invention as being particularly adapted to use on cotton picker endless spindle slat conveyors, I do not wish to limit myself to that particular use as my invention may be found advantageous on other chain conveyors.

From the foregoing description, taken in connection with the accompanying drawing, it is thought that the construction, operation, and advantages of the invention will be clear to those skilled in the art.

What I claim is:

1. In a cotton picking machine having a slatted conveyor supported by a frame and including spaced apart endless chains entrained around driving and driven wheels, the driving wheels being fixedly located at one end of the frame and the driven wheels being slidably and slightly rockably mounted in the other end of the frame, and electrically energized means governed by varying slack in the chain itself and operatively connected with said driven wheels in a pushing relation thereto and in a direction away from the driving wheels to take up slack in the chains when such slack occurs.

2. In a cotton picking machine having a slatted conveyor supported by a frame, spaced apart endless chains entrained around driving and driven wheels, the driving wheels being mounted on the upper and lower ends of a shaft, said shaft being journaled in a first tubular housing, said housing being fixedly secured to one end of the frame and the driven wheels mounted on the upper and lower ends of a shaft journaled in a second tubular housing slidably and rockably mounted in the other end of the frame, the improvement which includes a screw and nut device mounted on said frame and pivotally connected with said second tubular housing in a pushing relation thereto, a servomotor supported on a frame member and having means thereon for driving said nut, a fixed contact on said member, an electric circuit including a source of power connecting said fixed contact and a movable contact with said servomotor, said movable contact comprising a lever pivotally mounted on said support and engaging said chain at all times, the inward thrust of said chain upon slack occurring therein urging said lever into engagement with said fixed contact for closing the circuit to said servo-motor.

3. In a cotton picking machine having a slatted conveyor supported by a frame, spaced apart endless chains entrained around driving and driven wheels, the driving wheels being mounted on the upper and lower ends of a shaft, said shaft being journaled in a first tubular housing, said housing being fixedly secured to one end of the frame and the driven wheels mounted on a shaft journaled in a second tubular housing slidably and rockably mounted in the other end of the frame, the improvement which includes an electrically energized means governed by the inward thrust of the chain itself and pivotally connected with the second tubular housing midway between the driven wheels in pushing relation thereto to take up slack in the chains when such slack occurs, said means including a servo-motor, a power transmitting and translating connection between said motor and said driven wheels, and an electric circuit including said motor, a source of energy, and a circuit closer operatively related to one of said chains when slack.

4. In a cotton picking machine, an endless slatted chain conveyor, a supporting frame which includes a rigidly mounted tubular housing and a slidable mounting in which is positioned a second tubular housing, a driving shaft journaled in said first tubular housing, a driving sprocket wheel on each end of said driving shaft, a driven shaft journaled in said second tubular housing, a driven wheel on each end of said driven shaft, two endless chains entrained around said driving and driven wheels, and means governed by said chains for automatically pushing said second tubular housing away from said first tubular housing to take up slack as it occurs in said chains, said pushing means being pivotally connected near the center of said second tubular housing.

5. In a cotton picking machine having an endless slatted chain conveyor, a supporting frame which includes a rigidly mounted tubular housing in which is journaled a driving shaft having a driving sprocket wheel on each end thereof, and a slot in which is slidably and rockably mounted a second tubular housing in which is journaled a driven shaft having a driven wheel on each end thereof in horizontal alignment with said driving wheels, the chains of said conveyor being entrained around said driving and driven wheels, the improvement which includes means governed by the chain itself for automatically pushing said second tubular housing away from said first tubular housing to take up slack as it occurs in said chains, said pushing means being pivotally connected to said second tubular housing about midway between the wheels, and including a servo-motor operatively connected with said second tubular housing, an electric circuit including a source of energy, said motor, and a chain-slack-operated circuit closer.

6. In a cotton picking machine, an endless slatted chain conveyor, a supporting frame which includes a tubular housing rigidly mounted at one end thereof and at the other end a slotted bracket in which is adjustably mounted a second tubular housing, a driving shaft journaled in said first tubular housing and having a driving sprocket mounted on each end thereof, a driven shaft journaled in the adjustably mounted second tubular housing and having a driven wheel mounted on each end thereof in horizontal alignment with the driving sprockets, two endless chains of the conveyor being entrained, one around each driving sprocket and driven wheel, the improvement which includes means governed by the varying slack in the chain itself for automatically pushing said second tubular housing away from the first tubular housing to take up slack as it occurs, said last named means including a servo-motor pivotally connected with said second tubular housing, an electric circuit including a source of energy, said motor, and a circuit closer which includes a fixed contact and a movable contact lever engaging said chain and responsive to slack chain thrust for closing the circuit.

7. In an endless chain conveyor a frame having a driving shaft and a driven shaft with the driven shaft being movable in the frame, sprockets secured to said shafts, a chain entrained about said sprocket, a transverse extending member secured to said frame, a support having one end connected to said driving shaft and the other end mounted on said member, means for actuating said driven shaft including a screw and nut device mounted on said support and engageable with said driven shaft, a servomotor supported on said member and having means thereon for driving said nut, a fixed contact on said support, an electric circuit including a source of power connecting said fixed contact and a movable contact with said servomotor, said movable contact comprising a lever pivotally mounted on said support and engaging said chain at all times, said chain upon slack occurring therein urging said lever into engagement with said fixed contact for closing the circuit to said servomotor.

JOHN D. RUST.

References Cited in the file of this patent

UNITED STATES PATENTS

| Number | Name | Date |
| --- | --- | --- |
| 576,699 | Seaman | Feb. 9, 1897 |
| 2,316,173 | Kratz | Apr. 13, 1943 |
| 2,341,273 | Helberg | Feb. 8, 1944 |